(12) United States Patent
Kanamaru (10) Patent No.: US 8,733,824 B2
(45) Date of Patent: May 27, 2014

(54) CONSTRUCTION MACHINE WITH UPPER SLEWING BODY

(75) Inventor: Hiroshi Kanamaru, Hiroshima (JP)

(73) Assignee: Kobelco Construction Machinery Co., Ltd., Hiroshima-shi (JP)

(*) Notice: Subject to any disclaimer, the term of this patent is extended or adjusted under 35 U.S.C. 154(b) by 0 days.

(21) Appl. No.: 13/608,238

(22) Filed: Sep. 10, 2012

(65) Prior Publication Data

US 2013/0094895 A1 Apr. 18, 2013

(30) Foreign Application Priority Data

Oct. 14, 2011 (JP) .................................. 2011-226650

(51) Int. Cl.
*B60R 13/04* (2006.01)
(52) U.S. Cl.
CPC ..................................... *B60R 13/04* (2013.01)
USPC ..................... 296/191; 296/193.08; 180/89.12
(58) Field of Classification Search
USPC .................. 296/187.08, 190.05, 190.08, 191, 296/193.07; 180/84, 89.12, 89.13; 280/790, 280/797, 800; 37/347, 379
IPC ........................................ B62D 025/24,055/00
See application file for complete search history.

(56) References Cited

U.S. PATENT DOCUMENTS

| 7,637,560 B2 * | 12/2009 | Murase | 296/193.07 |
| 2006/0283914 A1 * | 12/2006 | Murase | 228/101 |
| 2010/0314909 A1 * | 12/2010 | Fuchs et al. | 296/191 |

FOREIGN PATENT DOCUMENTS

| EP | 1 733 954 A2 | 12/2006 |
| EP | 1 733 954 A3 | 12/2006 |
| JP | 57-12372 U | 1/1982 |
| JP | 2000-6849 A | 1/2000 |
| JP | 2000-43759 A | 2/2000 |
| JP | 2004-17928 | 1/2004 |
| JP | 2007-32477 A | 2/2007 |
| JP | 2008111254 A * | 5/2008 |
| JP | 2009-214655 A | 9/2009 |

OTHER PUBLICATIONS

Extended European Search Report issued Feb. 14, 2013 in European Patent Application No. 12184626.5.

* cited by examiner

*Primary Examiner* — Glenn Dayoan
*Assistant Examiner* — Jason S Daniels
(74) *Attorney, Agent, or Firm* — Oblon, Spivak, McClelland, Maier & Neustadt, L.L.P.

(57) ABSTRACT

Provided is a construction machine which comprises an upper slewing body including: a frame bottom plate formed with an downward opening; an undercover detachably attached to the frame bottom plate to close up the opening; and a connection member for connecting the undercover to the frame bottom plate. The undercover includes a cover-forming member made of a single plate fabricated to have a base portion extending along a lower surface of the frame bottom plate and a bulging portion bulging upwardly from the base portion to be inserted into the opening. The base portion has a contact area in an outer edge region thereof to make contact with the lower surface of the frame bottom plate from the lower side thereof. The connection member connects the bulging portion to a region of the frame bottom plate, the region located above the lower surface of the frame bottom plate.

4 Claims, 8 Drawing Sheets

FIG.8

CONSTRUCTION MACHINE WITH UPPER SLEWING BODY

BACKGROUND OF THE INVENTION

1. Field of the Invention

The present invention relates to a construction machine having an upper slewing body, wherein the upper slewing body comprises a frame bottom plate configured as a bottom wall thereof and formed with a downward opening.

2. Description of the Background Art

Generally, a construction machine, such as a hydraulic shovel, has a lower propelling body, and an upper slewing body provided on the lower propelling body to house various devices, such as an engine. The upper slewing body comprises a frame bottom plate configured as a bottom wall thereof and formed with a downward opening, that is, an opening opened downwardly so as to allow the devices to be inspected, and an undercover detachably attached to the frame bottom plate so as to close up the opening.

JP 2004-17928 A discloses a construction machine having such a frame bottom plate and such an undercover as is described above. The undercover disclosed in this publication is disposed under a hydraulic unit or a hydraulic pipe housed in an upper slewing body, and has a shape bulging downwardly from a lower surface of the frame bottom plate so as to be capable of retaining oil which leaks out of the hydraulic unit and others inside the undercover.

The shape thus bulging downwardly from the lower surface of the frame bottom plate, however, increases frequency of collisions of sand, rubble or the like raised from the ground with the undercover during traveling or during slewing of the upper slewing body, thereby making the undercover be likely to be damaged. Reversely, in the case of an undercover formed in a flat plate shape extending along the lower surface of the frame bottom plate so as to avoid the above damage, the undercover cannot have sufficient rigidity, which generates the possibility of occurrence of deformation of the undercover or large vibration noise therefrom.

SUMMARY OF THE INVENTION

It is an object of the present invention to provide a construction machine having an under cover, the construction machine being capable of suppressing damage to the undercover due to sand or the like while ensuring sufficient rigidity of the undercover.

The present invention provides a construction machine comprising an upper slewing body, wherein the upper slewing body includes: a frame bottom plate constituting a bottom wall of the upper slewing body and formed with a downward opening; an undercover detachably attached to the frame bottom plate so as to close up the opening; and a connection member for connecting the undercover to the frame bottom plate. The undercover comprises a cover-forming member made of a single plate so fabricated as to have a base portion extending along a lower surface of the frame bottom plate and a bulging portion bulging upwardly from the base portion and adapted to be inserted into the opening. The base portion has a contact area located in an outer edge region thereof so as to be connected to the frame bottom plate while making contact with the lower surface of the frame bottom plate. The connection member is adapted to connect the bulging portion to a region of the frame bottom plate, the region located above the lower surface of the frame bottom plate.

DESCRIPTION OF THE PREFERRED EMBODIMENTS

With reference to the drawings, there will be described an embodiment according to the present invention.

Figure 1:
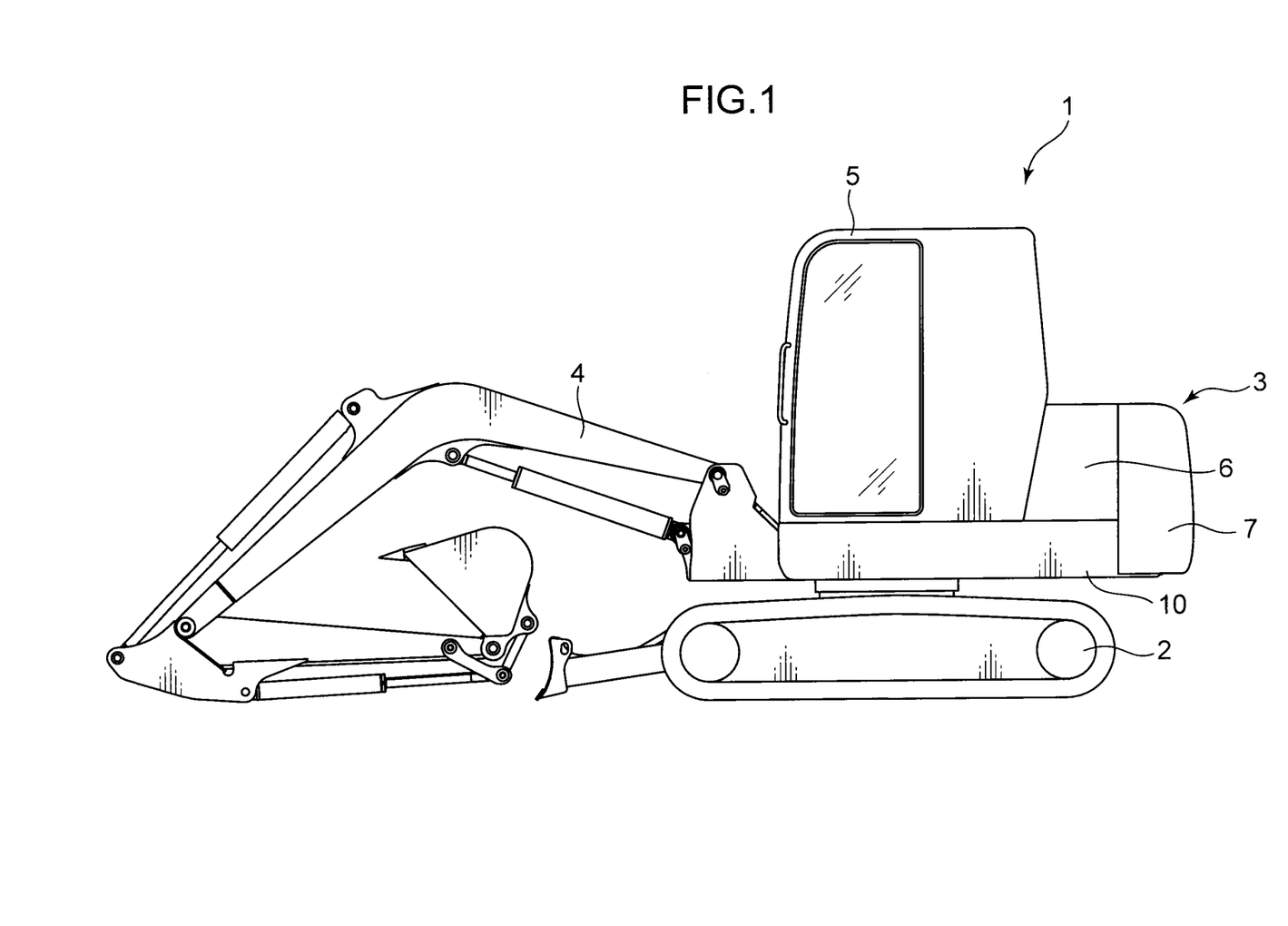
FIG. 1 is a schematic side view of a construction machine according to one embodiment of the present invention.

FIG. 1 is a schematic side view of a hydraulic shovel 1, one example of a construction machine. The hydraulic shovel 1 includes a lower propelling body 2, an upper slewing body 3 slewably mounted on the lower propelling body 2, and a working implement 4 installed to the upper slewing body 3. The upper slewing body 3 includes a slewing frame 10, an undercover 30 attached to the slewing frame 10, and a plurality of brackets 60 each serving as a connection member for connecting the undercover 30 to the slewing frame 10. On the slewing frame 10 are mounted an operator cabin 5, an engine room 6 housing various devices such as an engine and a hydraulic pump, and a counterweight 7.

Figure 2:
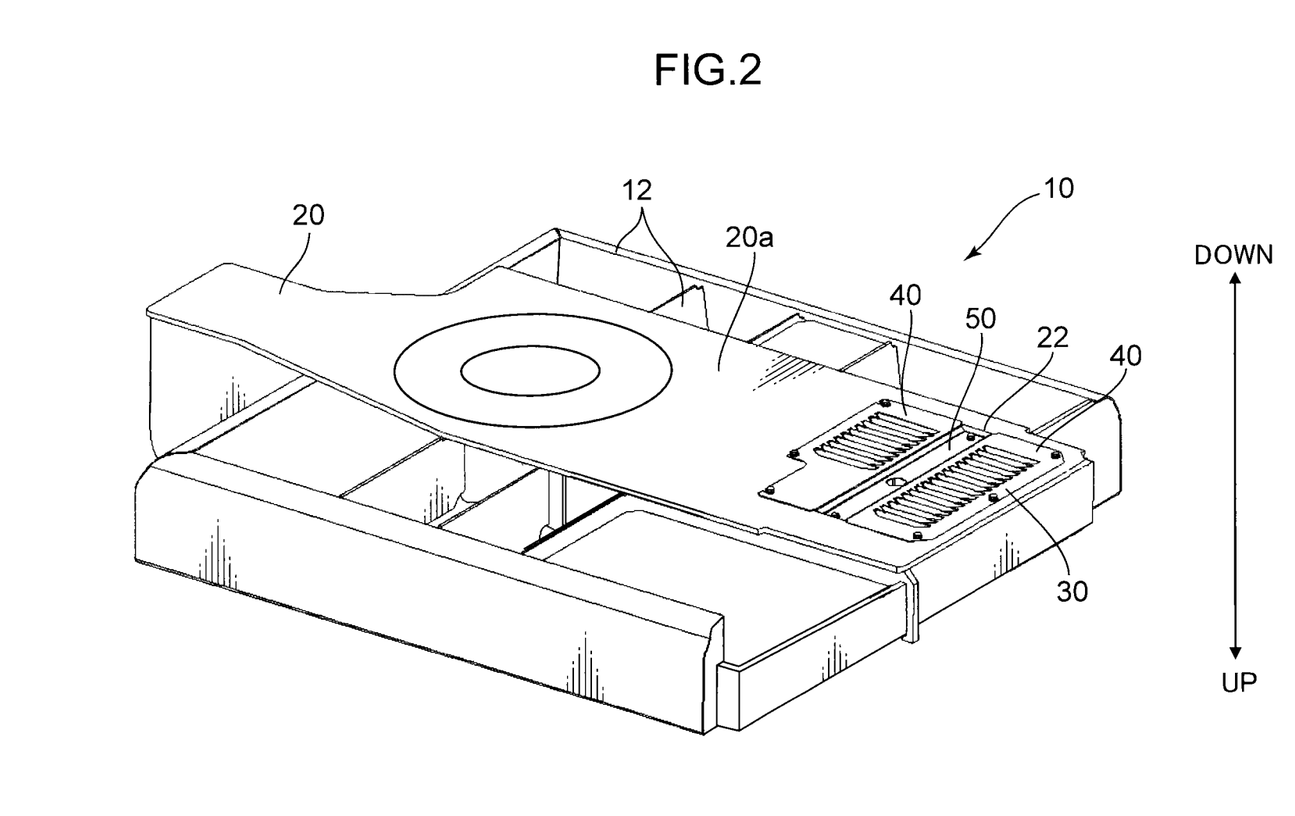
FIG. 2 is a perspective view of an upper slewing body of the construction machine in FIG. 1, when viewed upwardly from below the upper slewing body.
Figure 3:
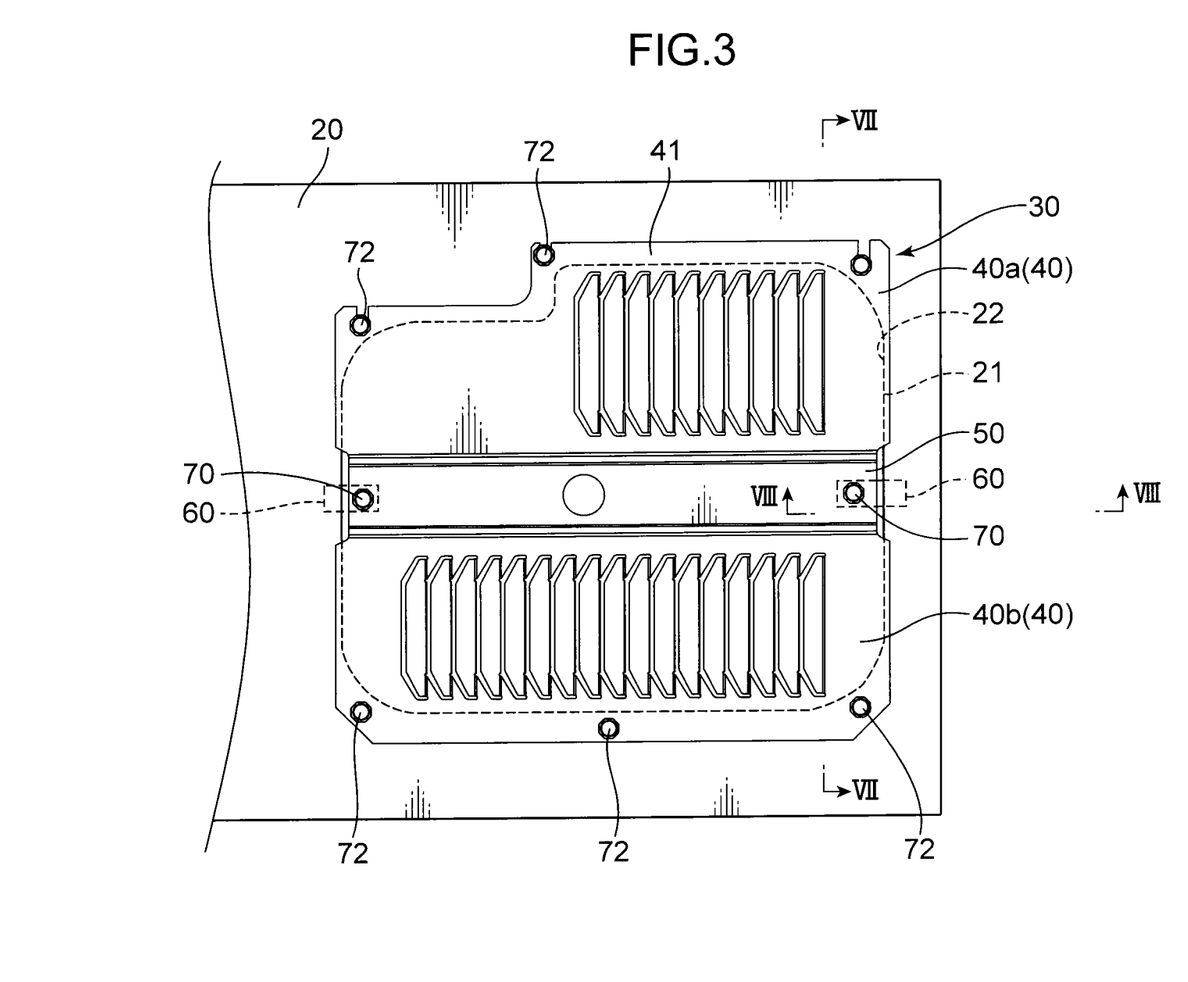
FIG. 3 is a bottom view illustrating a part of the upper slewing body in an attached state of an undercover.
Figure 4:
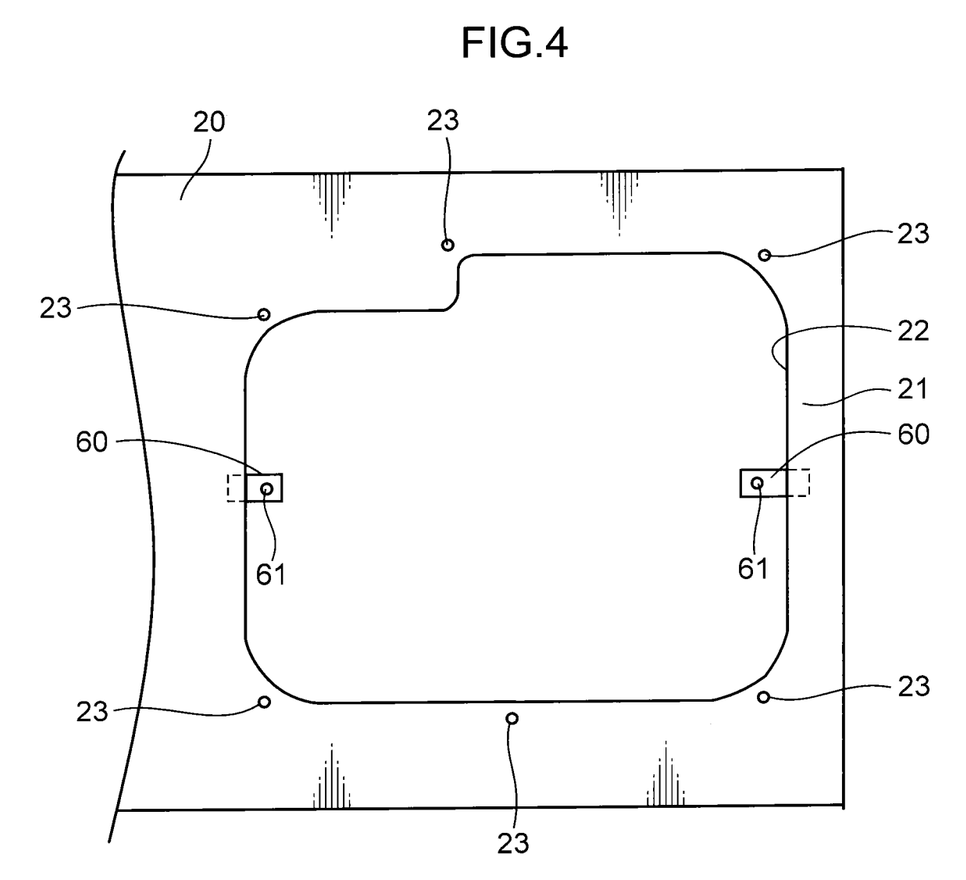
FIG. 4 is a bottom view corresponding to FIG. 3, in a detached state of the undercover.

FIG. 2 is a perspective view of the upper slewing body 3, when viewed upwardly from therebelow. FIG. 3 is a bottom view showing a part of the upper slewing body 3. FIG. 4 is a bottom view showing a state in which the undercover 30 shown in FIG. 3 is detached.

The slewing frame 10 includes a frame bottom plate 20 and a plurality of frame members 12 provided above the frame bottom plate 20. The frame bottom plate 20 is a generally flat plate-shaped member extending in a front-rear direction of the upper slewing body 3, forming a bottom wall of the upper slewing body 3.

The frame bottom plate 20 has a rear portion formed with an opening 22 for inspection of the devices in the engine room 6, and others. In this embodiment, the opening 22 has a generally rectangular shape including a long side extending widthwise of the upper slewing body 3. The undercover 30 is detachably attached to the frame bottom plate 20 so as to close up the opening 22, and can be detached for inspection or the like.

Figure 5:
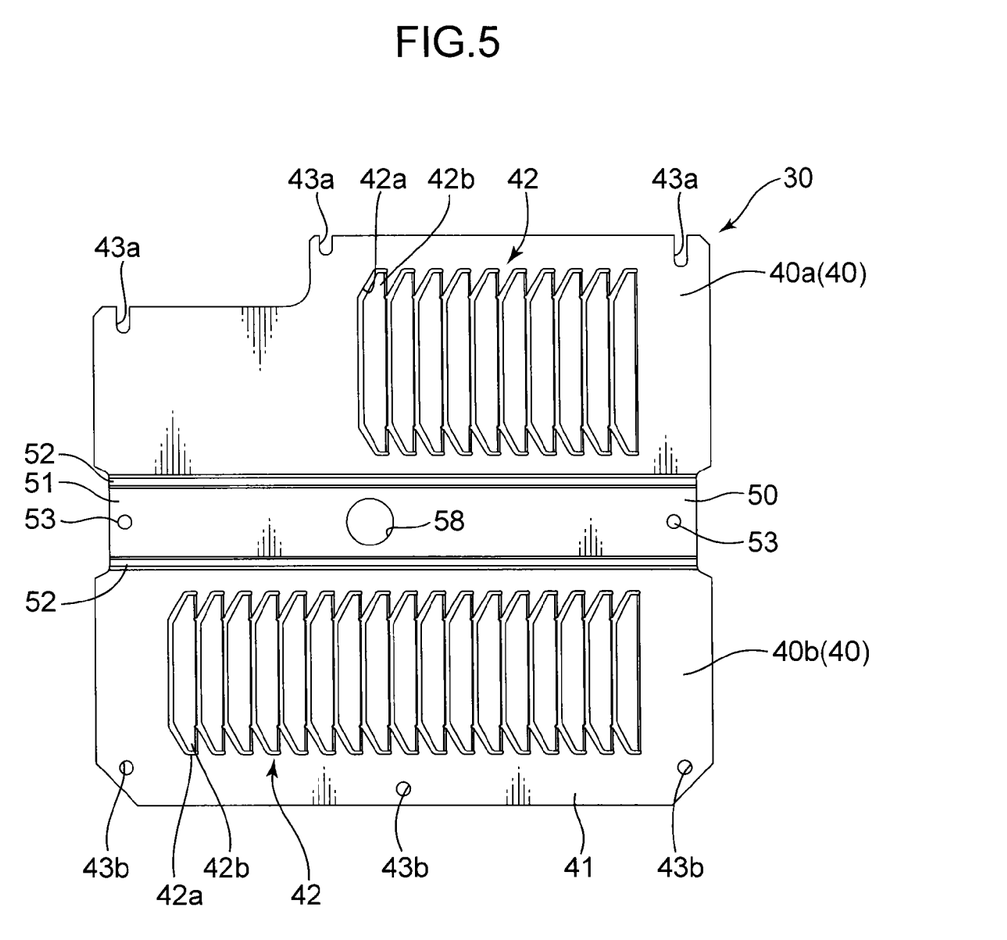
FIG. 5 is a plan view of the undercover.
Figure 6:
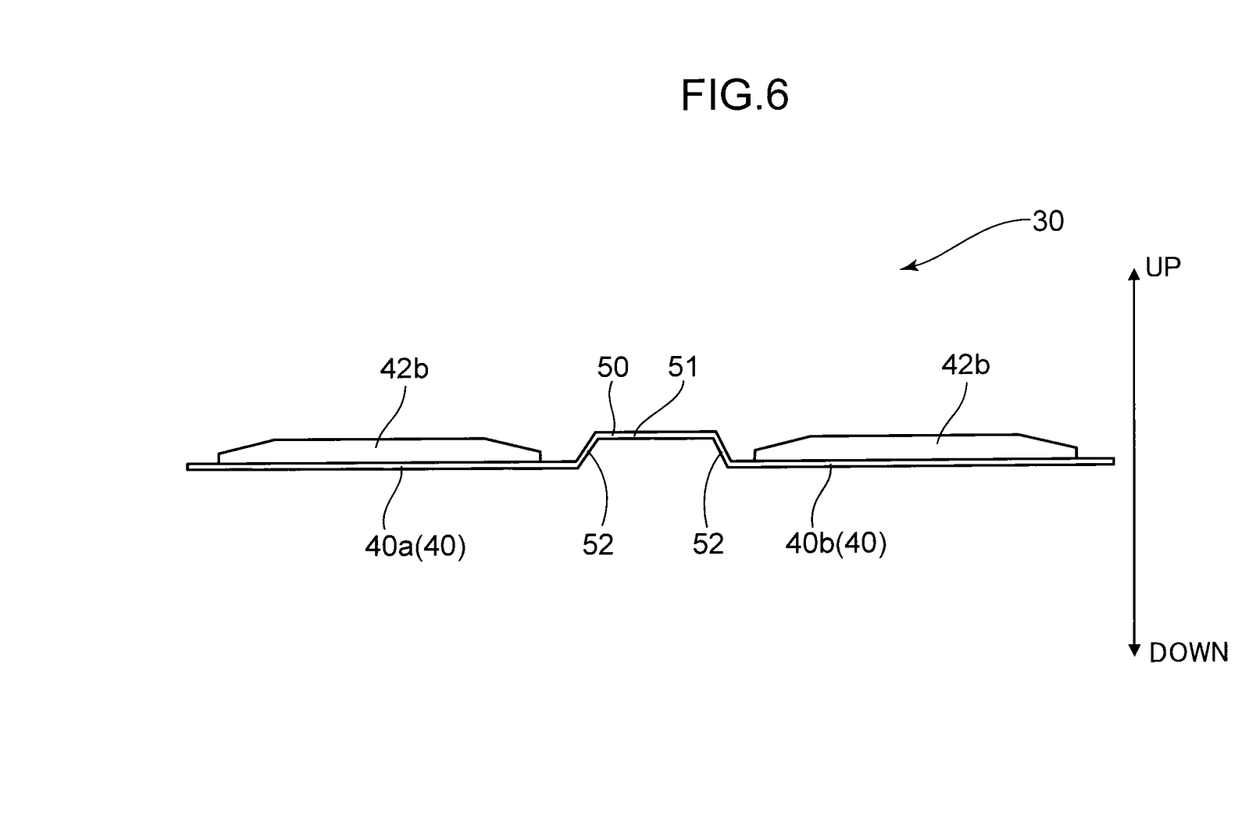
FIG. 6 is a side view of the undercover.
Figure 7:
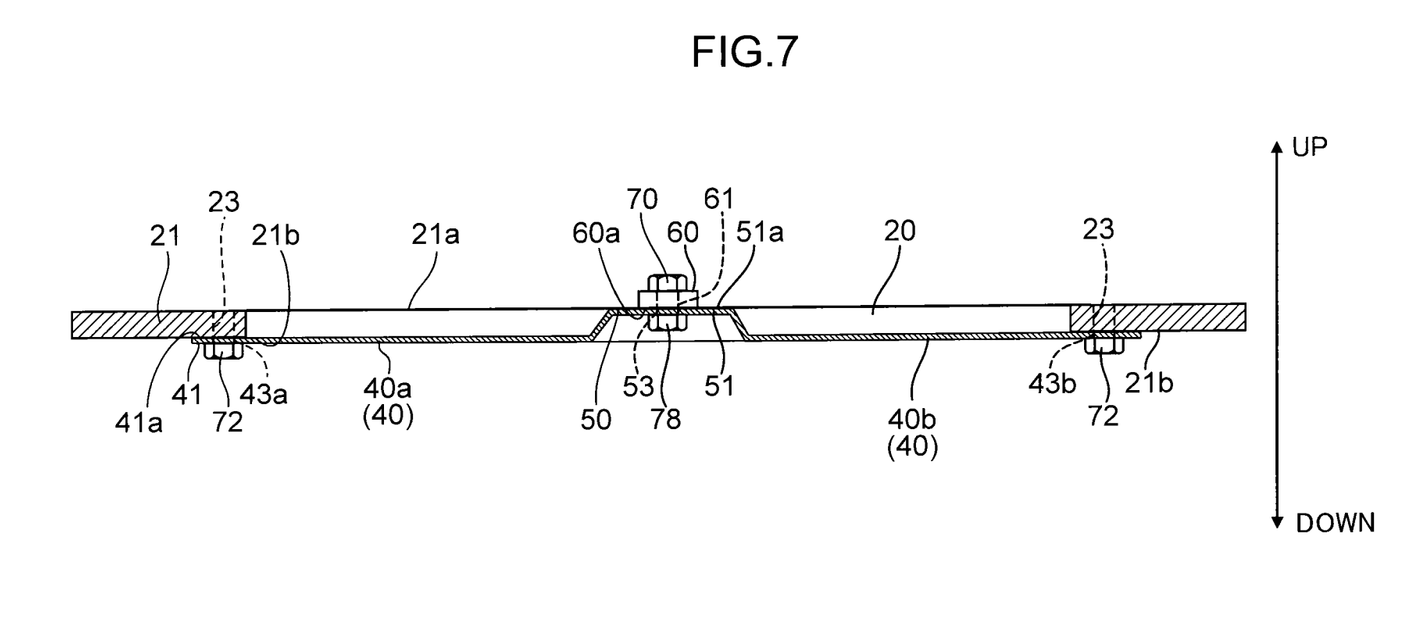
FIG. 7 is a sectional view taken along the line VII-VII in FIG. 3.
Figure 8:
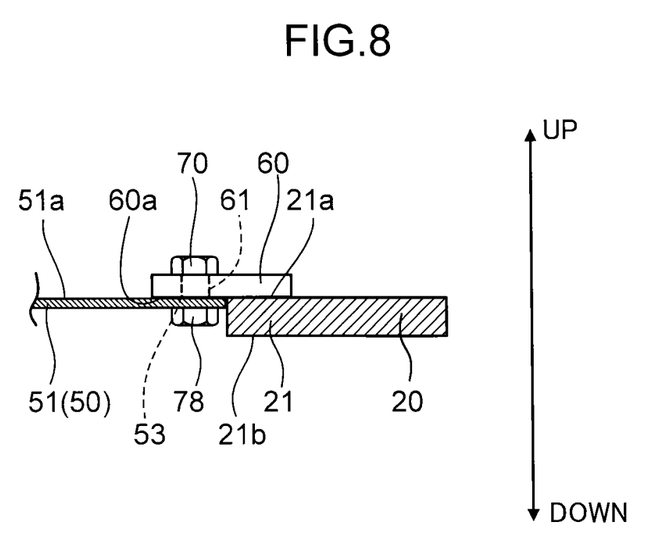
FIG. 8 is a sectional view taken along the line VIII-VIII in FIG. 3.

FIG. 5 is a plan view of the undercover 30, when viewed from a side of a lower surface of the frame bottom plate 20 to which the undercover 30 has been attached. FIG. 6 is a side view of the undercover 30. FIG. 7 is a sectional view taken along the line VII-VII in FIG. 3. FIG. 8 is a sectional view taken along the line VIII-VIII in FIG. 3.

The undercover 30 includes a cover-forming member composed of a single plate. The single plate is fabricated such that the cover-forming member has a flat plate-shaped base portion 40 and a bulging portion 50 bulging from the base portion 40. In other words, the base portion 40 and the bulging portion 50 are provided in the undercover 30 by fabricating the single plate for forming the cover-forming member. The presence of the bulging portion 50 gives the undercover 30 a three-dimensional shape, thus making the rigidity of the undercover 30 be greater than that of an undercover which would be shaped into a simple flat plate.

The undercover 30 has a generally rectangular shape in plan view, correspondingly to the opening 22, and is adapted to be attached to the frame bottom plate 20 in a posture of extending widthwise of the upper slewing body 3. In detail, the undercover 30 has a shape wholly greater than that of the opening 22, except opposite end regions of the bulging portion 50. Specifically, the undercover 30 has an outer edge region 41 capable of covering an inner edge region 21 of the frame bottom plate 20 around the opening 22, from a lower side thereof, and is adapted to be attached to the frame bottom plate 20 in such a posture that the bulging portion 50 protrudes upwardly beyond the base portion 40 into the opening 22.

In the following description about the undercover 30, up and down directions in an attached state thereof will be referred to simply as "up and down directions".

The bulging portion 50 has a cross-sectional shape bulging upwardly from the base portion 40 in a generally rectangular pattern. Specifically, the bulging portion 50 has a pair of standing walls 52 protruding upwardly from the base portion 40 and opposing to each other, and an upper wall 51 extending horizontally to interconnect upper ends of the standing walls 52. In this embodiment, a bulging size of the bulging portion 50 from the base portion 40, namely, a vertical offset distance between the base portion 40 and the upper wall 51, is set to be approximately equal to a thickness of the frame bottom plate 20, as shown in FIG. 7.

The bulging portion 50 extends across the undercover 30. In detail, the bulging portion 50 extends linearly over the entire longitudinal length of the undercover 30 (over the entire length of the undercover 30 in its longitudinal direction), in an approximately widthwise central region of the undercover 30 (in an approximately central region of the undercover 30 in a direction perpendicular to the longitudinal direction). This shape can be formed by subjecting a single plate for forming the cover-forming member to a simple press working such as press brake bending. Besides, longitudinally opposite ends of the bulging portion 50 can be fixed to the frame bottom plate 20, as described later, the fixation enabling the rigidity of the bulging portion 50 in the attached state and further the rigidity of the undercover 30 to be enhanced.

Since the undercover 30 in this embodiment, as mentioned above, has to be attached to the frame bottom plate 20 so that the outer edge region 41 of the undercover 30 covers the opening-defining inner edge region 21 of the frame bottom plate 20 from therebelow, each of the longitudinally opposite ends of the bulging portion 50 is located inwardly from a region of an outer edge of the base portion 40, the region being adjacent to the opposite ends, so as to prevent the opening-defining inner edge region 21 of the frame bottom plate 20 and the bulging portion 50 from their interference, specifically, so as to allow the entire bulging portion 50 to be inserted inside the opening 22.

The upper wall 51 of the bulging portion 50 has longitudinally opposite ends which are formed with respective bolt holes 53. Each of the bolt holes 53 is formed in a widthwise central region of the upper wall 51 and penetrates through the upper wall 51 in its thickness direction. Into each of the bolt holes 53 is inserted a bolt 70 to fix the upper wall 51 of the bulging portion 50 to the frame bottom plate 20. On the other hand, the upper wall 51 of the bulging portion 50 is formed with a through-hole 58 formed in a longitudinally central region thereof to penetrate through the upper wall 51 in the thickness direction, so that oil in the engine room can be discharged via the through-hole 58.

The bulging portion 50 extending across the widthwisely central region of the undercover 30 as mentioned above divides the base portion 40 into two respective parts located on both sides of the bulging portion 50 widthwise of the undercover 30. In other words, the base portion 40 consists of a first base portion 40a and a second base portion 40b which are located across the bulging portion 50 from each other. Each of the first and second base portions 40a, 40b is provided with a louver 42 for discharging hot air in the engine room 6 to an outside of the upper slewing body 3. Each of the louvers 42 includes a gap-defining portion and a plurality of vanes 42b. The gap-defining portion is formed of a part of the plate member forming each of the first base portion 40a and the second base portion 40b, formed with a plurality of gaps 42a. Each of the vanes 42b is disposed in each of the gaps 42a so as to protrude upwardly from the gap-defining portion. The gap-defining portion and the vanes 42b are formed by fabrication of the cover-forming member. The gaps 42a and vanes 42b are aligned in a direction parallel to the longitudinal direction of the bulging portion 50, each of them extending in a direction perpendicular to the direction in which the gaps 42a and vanes 42b are aligned. The gaps 42a and vanes 42b thus aligned in the direction parallel to the longitudinal direction of the bulging portion 50 can be continuously fabricated in the alignment direction thereof with no interference with the bulging portion 50.

The outer edge region 41 of the base portion 40, which includes a contact area, is formed with a plurality of bolt insertion sections 43a and a plurality of bolt insertion sections 43b, each of the insertion sections 43a and 43b penetrating through the outer edge region 41. Each of the bolt insertion sections 43a is a cutout which is formed in one of widthwise opposed edge regions of the base portion 40, specifically, in a part of the outer edge region 41 of the base portion 40 on the side of the first base portion 40a so as to have a shape opened outwardly. The bolt insertion sections 43a are formed at respective three positions: longitudinally opposite ends and longitudinally approximately central position of the base portion 40. Each of the bolt insertion sections 43b is a through-hole which is formed in the other edge region of the base portion 40, specifically, in a part of the outer edge region 41 of the base portion 40 on the side of the second base portion 40b. The bolt insertion sections 43b are formed at three respective positions: the longitudinally opposite ends and the longitudinally approximately central position of the base portion 40. Into each of the bolt insertion sections 43a and 43b is a bolt 72 to fix the outer edge region 41 of the base portion 40 to the frame bottom plate 20.

Next will be described a structure for interconnection of the undercover 30 and the frame bottom plate 20.

As shown, primarily, in FIGS. 4 and 8, the interconnection is achieved by use of the brackets 60, which are fixed to an upper surface 21a of the inner edge region 21 of the frame bottom plate 20 defining the opening 22. Each of the brackets 60 is fixed in such a posture that a part thereof protrudes inward beyond the upper surface 21a of the opening-defining inner edge region 21 of the frame bottom plate 20. Each of the brackets 60 has a planar lower surface 60a, and is fixed to the inner edge region 21 so that the lower surface 60a extends horizontally at the same height position as that of the upper surface 21a of the frame bottom plate 20. Specifically, each of the brackets 60 has a generally rectangular parallelepiped shape and disposed such that one of longitudinally opposite ends thereof makes surface contact with the upper surface 21a of the opening-defining inner edge region 21 of the frame bottom plate 20 while the other end protrudes inward of the opening 22. Each of the brackets 60 is fixed to the frame bottom plate 20, for example, by means of welding.

Each of the brackets 60 has a bolt hole 61, which is formed in the portion of each of the brackets 60, the portion protruding inwardly of the opening, and penetrates through the portion in a direction parallel to the thickness direction of the undercover 30. Into each of the bolt hole 61 is inserted a bolt 70 for fixing the bulging portion 50 to the frame bottom plate 20. The bolt 70 is fixed such that a distal end thereof protrudes downward beyond the lower surface 60a of the bracket 60. In this embodiment, the bolt 70 is a hexagon head bolt including a shank and a head having an outside dimension greater than that of the shank, the head being welded to the upper surface of the bracket 60 while the shank of the bolt 70 inserted into the bolt hole 61.

As shown, primarily, in FIG. 4, the opening-defining inner edge region 21 of the frame bottom plate 20 is formed with a plurality of bolt holes 23 each having an inner peripheral surface formed with an internal thread. The bolt holes 23 are formed at respective positions corresponding to the bolt insertion sections 43a and 43b formed in the outer edge region 41 of the base portion 40. Each of the bolts 72 for fixing the outer edge region 41 of the base portion 40 to the frame bottom plate 20 is inserted into a set of the bolt hole 23 and the bolt insertion section 43a or 43b corresponding to each other and screwed into the bolt holes 23. The bolts 72 thus inserted and screwed connects the outer edge region 41 of the base portion 40 to the lower surface 21b of the opening-defining inner edge region 21 of the frame bottom plate 20 while bringing the outer edge region 41 of the base portion 40 into contact with the lower surface 21b of the opening-defining inner edge region 21 from the lower side thereof. Thus, the base portion 40 is fixed to the frame bottom plate 20 so as to extend along the lower surface 21b of the frame bottom plate 20. The hexagon head bolt 70 fixed to each of the brackets 60 is inserted into respective bolt holes 53 formed in the upper wall 51 of the bulging portion 50 of the undercover 30, and a nut 78 is screwed on the distal end of the hexagon head bolt 70 to thereby connect the bulging portion 50 of the undercover 30 to the bracket 60 and thus the frame bottom plate 20, while bringing the bulging portion 50 into contact with the lower surface 60a of the bracket 60 from the lower side thereof. Besides, since the lower surface 60a of each of the brackets 60 extends horizontally at the same height position as that of the upper surface 21a of the frame bottom plate 20, the bulging portion 50 can be connected to the frame bottom plate 20 at a position above the lower surface 21b of the frame bottom plate 20 to which the outer edge region 41 of the base portion 40 is connected.

Thus connecting the base portion 40 and the bulging portion 50 to the frame bottom plate 20 at respective vertically different positions enables the rigidity of the undercover 30 in the attached state to be enhanced, as compared to the case of connecting them to the frame bottom plate 20 at the same height position, for example, the case of connecting both of them to the lower surface 21b of the frame bottom plate 20.

In this embodiment, as mentioned above, there is set a vertical distance between the base portion 40 and the upper wall 51 to be approximately equal to the thickness of the frame bottom plate 20. Herein, the term "approximately equal" means that they are equal to each other closely enough to allow the undercover 30 to be connected to the frame bottom plate 20, with no deformation of the undercover 30 and with first surface contact of the outer edge region 41 of the base portion 40 with the lower surface 21b of the opening-defining inner edge region 21 of the frame bottom plate 20 and second surface contact of an upper surface 51a of the bulging portion 50 with the lower surface 60a of the bracket 60. This makes it possible to reliably avoid a situation where the undercover 30 and one or more of the devices in the engine room are brought into contact or collision with each other due to the undercover 30 protruding upwardly from the frame bottom plate 20 to be thereby damaged.

As described above, in the hydraulic shovel 1 according to this embodiment, the undercover 30, provided with the base portion 40 and the bulging portion 50 bulging upwardly from the base portion 40, can ensure its high rigidity while being made of a single plate-like cover-forming member to thereby allow the cost to be kept at low level. In addition, connecting the undercover 30 to the frame bottom plate 20 at vertically different positions gives the undercover 30 enhanced rigidity in the attachment state thereof, thus more reliably suppressing damage to the undercover 30 and deformation and vibration of the undercover 30. Furthermore, the bulging portion 50, bulging upwardly from the base portion 40 to be inserted into the opening 22, ensures the above high rigidity while keeping a downward protruding size of the undercover 30 from the frame bottom plate 20 in a state of being attached to the frame bottom plate 20 be small, thus enabling damage to the undercover 30 due to sand, rubble or the like, to be suppressed.

Particularly, in this embodiment, the undercover 30 is permitted to be stably connected to the frame bottom plate 20 by the contact of the upper surface 51a of the bulging portion 50 with the lower surface 60a of the bracket 60 and the contact of the upper surface 41a of the base portion 40 with the lower surface 21b of the frame bottom plate 20; this makes it possible to more reliably suppress deformation and vertical vibration of the undercover 30.

The present invention is not limited to the above embodiment, but may include the following modifications.

The specific shape and position of the bulging portion can be appropriately changed. For example, the bulging portion may be formed in a central region of the undercover while the base portion being formed around the bulging portion. However, the bulging portion 50 as in the above embodiment, having a shape extending across the undercover 30, can be formed by simple press working.

The lower surface 60a of the bracket 60 does not have to be located at the same height position as that of the upper surface 21a of the frame bottom plate 20. For example, the bracket 60 may have a first portion protruding upwardly from the frame bottom plate 20 and a second portion protruding from an upper end of the first portion inwardly of the opening 22.

The bulging portion in the present invention may be provided in a plurality of areas of the undercover. In this case, it is preferable to fix each of the bulging portions to the frame bottom plate through a connection member.

Thus, the present invention provides a construction machine comprising an under cover, the construction machine being capable of suppressing damage to the undercover due to sand or the like while ensuring sufficient rigidity of the undercover. Specifically, provided is a construction machine, which comprises an upper slewing body including: a frame bottom plate constituting a bottom wall of the upper slewing body and formed with a downward opening; an undercover detachably attached to the frame bottom plate so as to close up the opening; and a connection member for connecting the undercover to the frame bottom plate. The undercover includes a cover-forming member made of a single plate fabricated to have a base portion extending along a lower surface of the frame bottom plate and a bulging portion bulging upwardly from the base portion and adapted to be inserted into the opening. The base portion has a contact area located in an outer edge region thereof so as to be connected to the frame bottom plate while making contact with the lower surface of the frame bottom plate from the lower side thereof. The connection member is adapted to connect the bulging portion to a region of the frame bottom plate, the region located above the lower surface of the frame bottom plate.

The undercover in the construction machine, including the single plate-like cover-forming member having the base portion and the bulging portion bulging upwardly from the base portion to be inserted into the opening, can ensure its high rigidity by its three-dimensional shape without remarkable structural complication, while keeping a downward protruding size of the undercover from the lower surface of the frame bottom plate be small to thereby suppress collision of sand, rubble or the like, against the undercover. In addition, connecting the base portion and the bulging portion of the undercover to the frame bottom plate at respective vertically different positions enables the rigidity of the undercover in an attachment state thereof to be enhanced, thus making it possible to more reliably suppress damage to the undercover and deformation and vibration of the undercover.

The connection member, according to the invention, preferably has a first portion fixed to an inner edge region of the frame bottom plate, the inner edge region defining the opening, and a second portion protruding beyond the opening-defining inner edge region of the frame bottom plate inwardly of the opening, the second portion adapted to be connected to the bulging portion while making contact with an upper surface of the bulging portion from an upper side thereof. Thus interconnecting the bulging portion and the connection member with the contact of the upper surface of the bulging portion with the connection member enables the bulging portion to be stably fixed to the frame bottom plate through the connection member with a simple structure.

It is preferable that the bulging portion extends across the undercover and the connection member connects longitudinally opposite ends of the bulging portion to the frame bottom plate. Thus connecting the longitudinally opposite ends of the bulging portion to the frame bottom plate enables the rigidity of the bulging portion and further the rigidity of the entire undercover to be effectively enhanced.

In this case, it is preferable that each of the longitudinally opposite ends of the bulging portion is located inwardly from an outer edge of a region of the base portion, the region being adjacent to the opposite ends, so as to allow the entire bulging portion to be inserted into the opening.

Besides, it is preferable, in the construction machine of the present invention, that the base portion has a louver formed by fabricating the cover-forming member, the louver including a gap-defining portion formed with a plurality of gaps and a plurality of vanes disposed in the gaps respectively to protrude upwardly from the gap-defining portion, the gaps and vanes of the louver being aligned parallel to a longitudinal direction of the bulging portion. The fabrication for forming the above gaps and vanes of the louver can be continuously performed without interference with the bulging portion.

This application is based on Japanese Patent application No. 2011-226650 filed in Japan Patent Office on Oct. 14, 2011, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A construction machine comprising an upper slewing body, the upper slewing body including: a frame bottom plate forming a bottom wall of the upper slewing body and formed with an opening opened downwardly; an undercover detachably attached to the frame bottom plate so as to close up the opening; and a connection member for connecting the undercover to the frame bottom plate, wherein the undercover includes a cover-forming member made of a single plate fabricated so as to have a base portion extending along a lower surface of the frame bottom plate and a bulging portion bulging upwardly from the base portion and adapted to be inserted into the opening, the base portion having a contact area located in an outer edge region of the base portion so as to be connected to the frame bottom plate while making contact with the lower surface of the frame bottom plate from a lower side thereof, and wherein the connection member has a first portion fixed to an upper surface of an inner edge region of the frame bottom plate, the inner edge region defining the opening, and a second portion protruding beyond the opening-defining inner edge region of the frame bottom plate inwardly of the opening and occupying only a part of the opening to allow the other part of the opening to remain open, the second portion being adapted to connect the bulging portion to a region of the frame bottom plate, the region being located above the lower surface of the frame bottom plate, while making contact with an upper surface of the bulging portion from an upper side thereof.

2. The construction machine as defined in claim 1, wherein the bulging portion extends across the undercover and the connection member connects longitudinally opposite ends of the bulging portion to the frame bottom plate.

3. The construction machine as defined in claim 2, wherein each of the longitudinally opposite ends of the bulging portion is located inwardly from an outer edge of a region of the base portion, the region being adjacent to the opposite ends, so as to allow the entire bulging portion to be inserted into the opening.

4. The construction machine as defined in claim 1, wherein the base portion has a louver formed by fabricating the cover-forming member, the louver including a gap-defining portion formed with a plurality of gaps and a plurality of vanes disposed in the gaps respectively to protrude upwardly from the gap-defining portion, the gaps and vanes of the louver being aligned parallel to a longitudinal direction of the bulging portion.

* * * * *